(12) United States Patent
Peterson et al.

(10) Patent No.: US 12,485,869 B2
(45) Date of Patent: Dec. 2, 2025

(54) APPARATUSES, METHODS, AND SYSTEMS FOR REDUCING BACKGROUND NOISE

(71) Applicant: Lenovo (Singapore) Pte. Ltd., New Tech Park (SG)

(72) Inventors: Nathan Peterson, Oxford, NC (US); Gary D. Cudak, Wake Forest, NC (US); John M. Petersen, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 295 days.

(21) Appl. No.: 18/092,113

(22) Filed: Dec. 30, 2022

(65) Prior Publication Data

US 2024/0217503 A1    Jul. 4, 2024

(51) Int. Cl.
| | | |
|---|---|---|
| *B60W 10/00* | (2006.01) | |
| *B60H 1/00* | (2006.01) | |
| *H02P 29/50* | (2016.01) | |
| *H04M 9/08* | (2006.01) | |

(52) U.S. Cl.
CPC ......... *B60W 10/00* (2013.01); *B60H 1/00507* (2013.01); *B60H 2001/006* (2013.01)

(58) Field of Classification Search
CPC . B60H 1/00507; H04L 65/1069; B60K 35/00; B60K 35/265; G10K 11/17881; G10L 21/0216; G10L 17/26; H04R 3/005; B60R 11/02; B60R 25/24; H04M 1/19; H04M 9/04; H04M 9/08; G09C 9/00309; H02P 29/50
See application file for complete search history.

(56) References Cited

U.S. PATENT DOCUMENTS

| | | | | |
|---|---|---|---|---|
| 5,548,652 A | * | 8/1996 | Fujiwara | G10K 11/17881 381/86 |
| 5,966,438 A | * | 10/1999 | Romesburg | H04M 9/08 379/406.01 |
| 6,028,537 A | * | 2/2000 | Suman | B60K 35/00 340/988 |
| 7,715,372 B2 | * | 5/2010 | Khasnabish | H04L 65/1069 370/290 |
| 9,859,836 B2 | * | 1/2018 | Yokoyama | H02P 29/50 |
| 2004/0142672 A1 | * | 7/2004 | Stankewitz | H04M 1/19 455/296 |
| 2005/0058232 A1 | * | 3/2005 | Murakami | B60R 25/24 375/350 |
| 2006/0014569 A1 | * | 1/2006 | DelGiorno | H04M 9/04 455/567 |
| 2009/0106029 A1 | * | 4/2009 | DeLine | B60R 11/02 704/E21.001 |

(Continued)

FOREIGN PATENT DOCUMENTS

WO    WO-2012097150 A1 *   7/2012   ............. G10L 17/26

*Primary Examiner* — Yuri Kan
(74) *Attorney, Agent, or Firm* — Kunzler Bean & Adamson

(57) ABSTRACT

Methods, communication devices, and systems are disclosed for automatically controlling sound producing components of a vehicle. In one embodiment, the method includes receiving an incoming communication and sending a first instruction to one or more vehicle components. The first instruction is configured to cause the one or more vehicle components to be placed in a reduced sound producing operational mode.

20 Claims, 5 Drawing Sheets

(56) References Cited

U.S. PATENT DOCUMENTS

2013/0121504 A1\* 5/2013 Adams .................. H04R 3/005
381/369
2016/0019891 A1\* 1/2016 Martinez ............ G10L 21/0216
704/275

\* cited by examiner

APPARATUSES, METHODS, AND SYSTEMS FOR REDUCING BACKGROUND NOISE

FIELD

The subject matter disclosed herein relates generally to vehicle operation and more particularly relates to apparatuses, methods, and systems for automatically reducing background noise when receiving a communication while operating the vehicle.

BACKGROUND

When a call is received in a car, a lot of ambient noise produced by various car components or due to open windows may make it difficult to hear the call.

BRIEF SUMMARY

Methods, apparatuses, and systems are disclosed for automatically controlling noise producing devices in a vehicle in response to receiving an incoming communication. In one embodiment, the method includes receiving an incoming communication and sending a first instruction to one or more vehicle components. The first instruction is configured to cause the one or more vehicle components to be placed in a reduced sound producing operational mode.

In another embodiment, an apparatus includes a communication device, a processor in data communication with the communication device, and a storage device configured to store machine-readable instructions that, when executed by the processor, cause the apparatus to receive an indication of an incoming communication from the communication device and send a first instruction to one or more vehicle components. The first instruction is configured to place the one or more vehicle components in a reduced sound producing operational mode.

In still another embodiment, a system includes one or more vehicle components, a communication device, a processor in data communication with the communication device, and a storage device configured to store machine-readable instructions that, when executed by the processor, cause the processor to receive an indication of an incoming communication from the communication device and send a first instruction to the one or more vehicle components. The one or more vehicle components are placed in a reduced sound producing operational mode based on the first instruction.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore considered to be limiting of scope, the embodiments will be described and explained with additional specificity and detail through the use of the accompanying drawings, in which.

DETAILED DESCRIPTION

Figure 1:
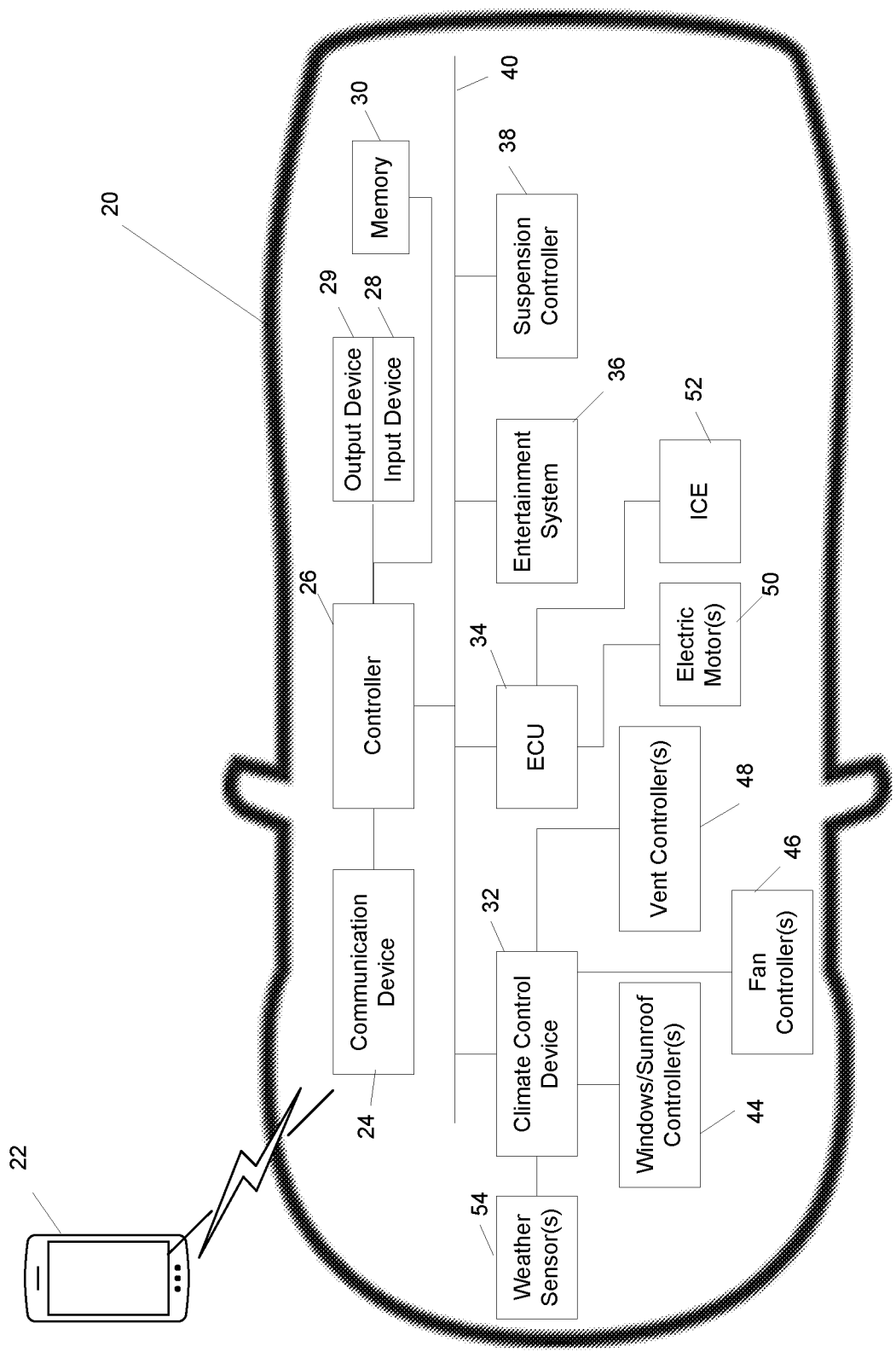
FIG. 1 is a schematic block diagram illustrating one embodiment of a vehicle and environment formed in accordance with an embodiment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmittable. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), solid state drive (SSD), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Referring to FIG. 1, in various embodiments, an exemplary vehicle 20 includes a controller 26 coupled to a communication device 24. The communication device 24 is capable of receiving incoming communications from a personal communication device 22 via a wireless or a wired connection or may receive communications from other external sources, such as, without, voice-over-IP or comparable means. The vehicle 20 further includes a memory 30 and user interface ("UI") devices (i.e., an output device 29 and an input device 28) that are coupled to the controller 26. The controller 26 is configured to receive information from and send mode/position control instructions to one or more of a plurality of vehicle components connected to a common data bus 40. The vehicle components include, but are not limited to, a climate control device 32, an engine control unit ("ECU") 34, an entertainment system 36, and the suspension controller 38.

In response to receiving an incoming communication (e.g., cell call, text message, or the like) with a personal communication device 22 or other network-based entities via the communication device 24 that is to be outputted to the speakers of the entertainment system 36, the output device 29, or the like, the controller 26 may send instructions to the climate control device 32, the ECU 34, the entertainment system 36, the suspension controller 38, or other controllable systems for placing respective devices in a mode of operation that would produce reduced ambient noise in the passenger cabin of the vehicle 20. For example, wind noise may be reduced by closing windows or sunroofs, engine noise may be reduced by switching to a quieter engine (e.g., an internal combustion engine ("ICE") to an electric motor), suspension noise may be reduced by switching to a smoother ride setting, or the entertainment system 36 may lower volume or mute output from other sound sources (e.g., auxiliary attachments, radio, compact disc player, network entertainment entity, or the like).

In various embodiments, the climate control device 32 may be in data communication with a window/sunroof controller(s) 44, a fan controller(s) 46, a vent controller(s) 48, and/or a weather sensor(s) 54. The window/sunroof controller(s) 44 is configured to manipulate window and/or sunroof actuators/motors for positioning the windows/sunroof at a desired position(s). The fan controller(s) 46 is configured to change power settings of a corresponding fan motor(s). The vent controller(s) 48 is configured to control operation of a vent actuator(s) for placing a corresponding vent(s) at a desired position(s). In response to receiving a reduced ambient noise mode instruction from the controller 26, the climate control device 32 may command the window/sunroof controller(s) 44 to close the respective windows/sunroof, the fan controller 46 to reduce or stop the respective fan(s), and/or the vent controller(s) 48 to change corresponding vent position(s) for reducing ambient noise.

In various embodiments, the ECU 34 may control operation of an electric motor(s) 50 and an internal combustion engine (ICE) 52 in the case where the vehicle 20 is a hybrid vehicle. In response to receiving the reduced ambient noise mode instruction from the controller 26, the ECU 34 may command drive power to be switch from powering the vehicle 20 with the ICE 52 to the electric motor(s) 50 provided there is available electrical power in a direct current (DC) power source(s).

In various embodiments, the entertainment system 36 may control audio output to speakers within the vehicle 20. In response to receiving the reduced ambient noise mode instruction from the controller 26, the entertainment system 36 may pause or stop actively playing sound, such as from a sound streaming source or a local source or reduce the outputted volume of any produced sound. For example, the sound from a satellite or over-the-air radio, auxilliary or wirelessly-attached music source are paused to allow a vehicle operator to better hear the incoming communication.

In various embodiments, the suspension controller 38 may control suspension settings, such as a sport mode, a normal mode, or a comfort mode in response to receiving the reduced ambient noise mode instruction from the controller 26. For example, with the current suspension setting in the sport mode, the suspension controller 38 causes the suspension setting to switch to a quieter suspension mode, such as the normal mode or the comfort mode.

In various embodiments, the memory 30 may store default settings or settings input by a user via the input device 28 or the personal communication device 22. The controller 26 sends instructions to the various vehicle components based on the stored settings.

Figure 2:
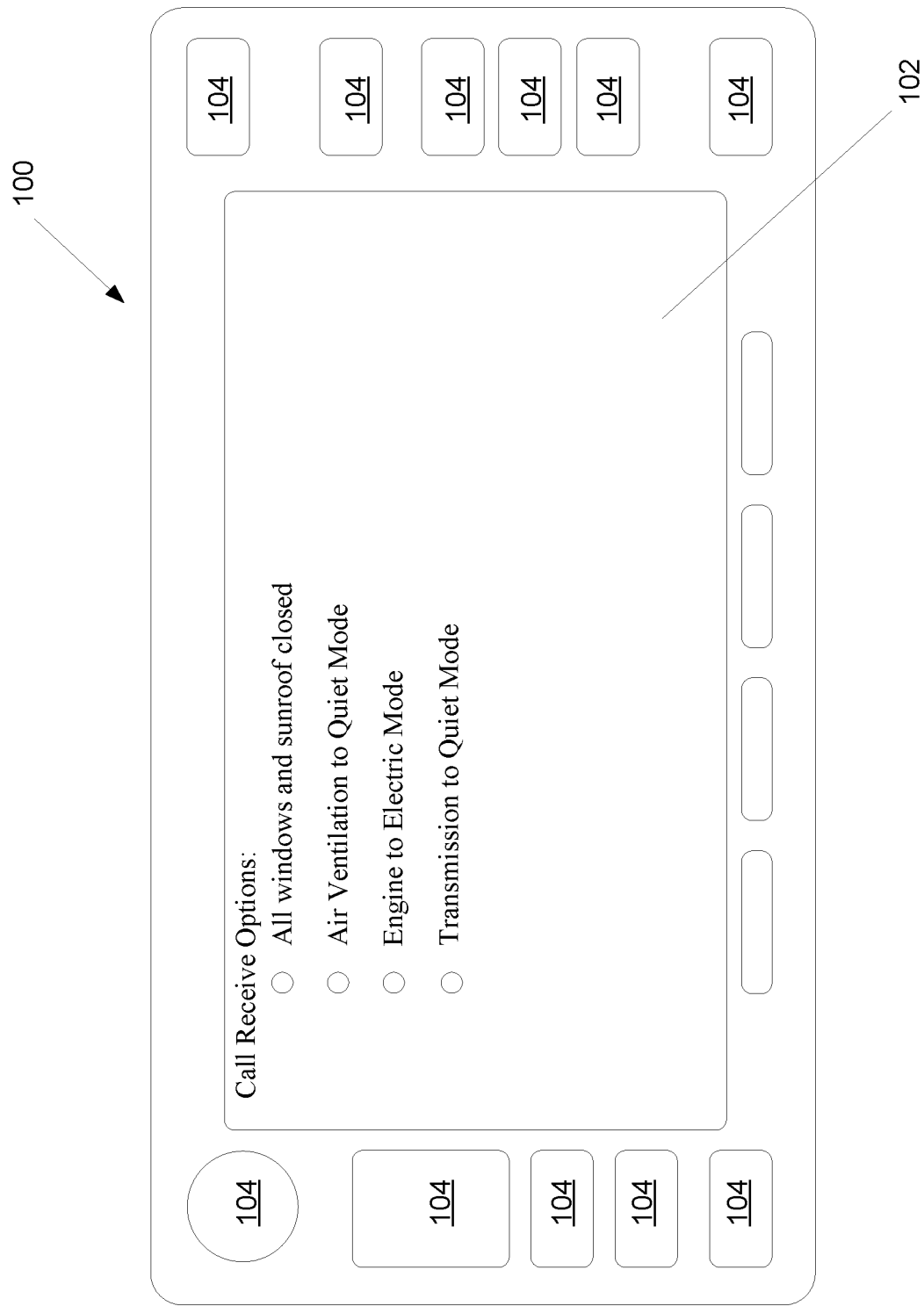
FIG. 2 is a schematic block diagram illustrating one embodiment of a user interface device formed in accordance with an embodiment.

Referring to FIG. 2, in various embodiments, the output device 29 may include a display device 100. The display device 100 may be a multifunction display device for outputting various information and allowing the user to interact with various vehicle components/systems. In a set up mode for reduced ambient noise mode operation, the controller 26 outputs a graphical user interface ("GUI") 102 to the display device 100. The GUI 102 provides user selections for determining how the controller 26 is to react when an incoming communication is received. The input device 28 may include buttons 104 associated with the display device 100, a touch screen capability imbedded in the display device 100, and/or a voice recognition component (not shown) linked with a microphone (not shown). The user selections inputted via the input device 28 are saved by the controller 26 in the memory 30.

Figure 3:
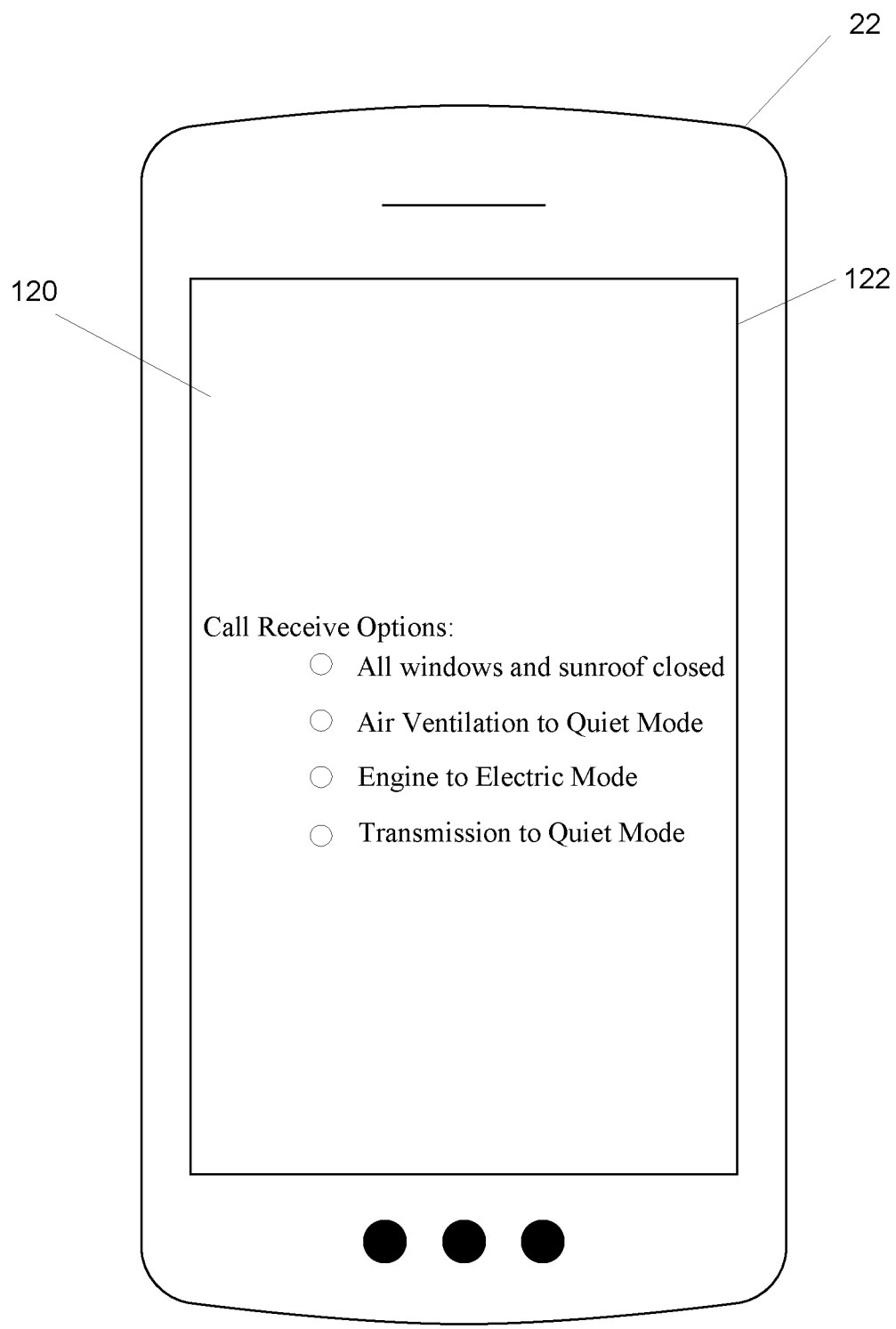
FIG. 3 is a front view of an exemplary communication device formed in accordance with an embodiment.

Referring to FIG. 3, in various embodiments, the personal communication device 122 includes a display device 122 that may also be configured to present a GUI 120 that allows a user to select the same or similar options as presented on the display device 100 of FIG. 2. The personal communication device 22 may include buttons associated with the display device 122, a touch screen capability imbedded in the display device 122, and/or a voice recognition component (not shown) linked with a microphone (not shown). The selections that the user makes from the GUI 120 are sent to the controller 26 via the communication device 24. The user selections are saved by the controller 26 in the memory 30.

Given by way of non-limiting example, in various embodiments, the vehicle 20 may be a vehicle powered by any power source, such as an ICE, an electric motor, or the like. For example, and given by way of non-limiting examples, in various embodiments, the vehicle may include a motor vehicle driven by wheels and/or tracks, such as, without limitation, an automobile, a truck, a sport utility vehicle (SUV), a cargo van, or the like. Given by way of further non-limiting examples, in various embodiments, the vehicle 20 may include a marine vessel such as, without limitation, a boat, a ship, a submarine, a submersible, or the like. Given by way of further non-limiting examples, in various embodiments, the vehicle 20 may include an aircraft such as, without limitation, a fixed wing aircraft, a rotary wing aircraft, a lighter-than-air (LTA) craft, or the like.

In various embodiments, the personal communication device 22 may include computing devices, such as desktop computers, laptop computers, personal digital assistants ("PDAs"), tablet computers, smart phones, media players, smart televisions (e.g., televisions connected to the Internet) with remote control devices, smart watches, optical head-mounted displays, or the like. In some embodiments, the personal communication device 22 includes any device having an input device capable of interacting with a communication application program, such as, without limitation, email, text messaging, cellular or voice-over-IP calls, or the like.

The controller 26, in one embodiment, may include any known controller capable of executing computer-readable instructions and/or capable of performing logical operations. For example, the controller 26 may be a microcontroller, a microprocessor, a central processing unit ("CPU"), a graphics processing unit ("GPU"), an auxiliary processing unit, a field programmable gate array ("FPGA"), or similar programmable controller. In some embodiments, the controller 26 executes instructions stored in the memory 30 to perform the methods and routines described herein.

The memory 30 or memory in the personal communication device 22, in one embodiment, is a computer readable storage medium. In some embodiments, the memory 30 includes volatile computer storage media. For example, the memory 30 may include a RAM, including dynamic RAM ("DRAM"), synchronous dynamic RAM ("SDRAM"), static RAM ("SRAM") and/or other types of memory as described earlier. In some embodiments, the memory 30 includes non-transitory, non-volatile computer storage media. For example, the memory 30 may include a hard disk drive, a flash memory, or any other suitable non-volatile computer storage device. In some embodiments, the memory 30 includes both volatile and non-volatile computer storage media. In some embodiments, the memory 30 also stores program code and related data, such as an operating system or other controller algorithms operating on the controller 26.

The display device 100, in one embodiment, may include any known electronically controllable display or display device. The display device 100 may be designed to output visual, audible, and/or haptic signals. In some embodiments, the display device 100 includes an electronic display capable of outputting visual data to a user. For example, the display device 100 may include, but is not limited to, a liquid crystal display ("LCD"), a light-emitting diode ("LED") display, an organic LED ("OLED") display, a projector, or similar display device capable of outputting images, text, or the like to a user. As another, non-limiting, example, the display device 100 may include a wearable display such as a smart watch, smart glasses, a heads-up display, or the like.

Figure 4:
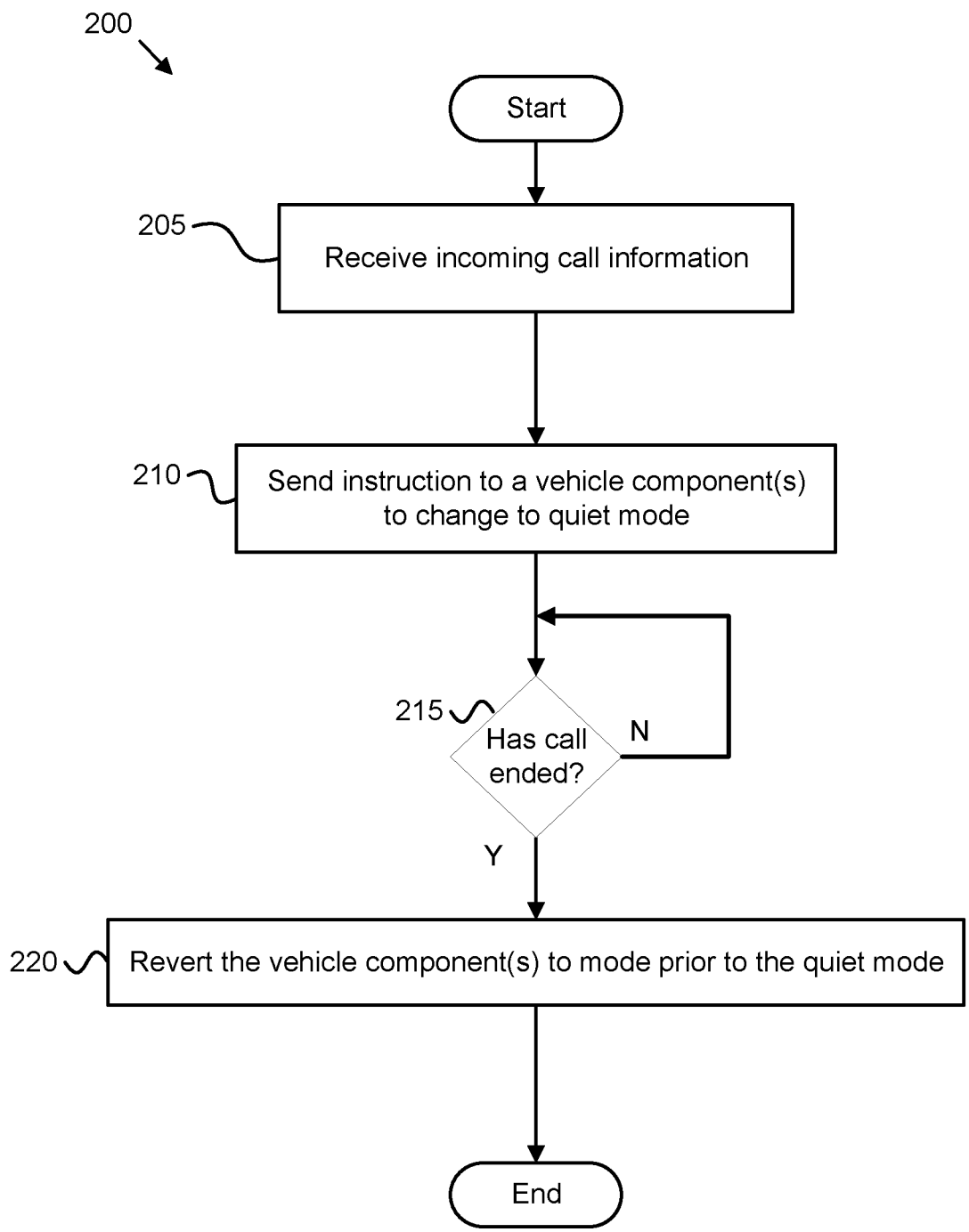
FIG. 4 is a flow diagram of a method performed by a controller in accordance with an embodiment.

Referring to FIG. 4, a flow diagram of a method 200 is described. At a block 205, an incoming call information is received from a communication device. At a block 210, an instruction(s) is sent to a vehicle component(s) to change to a quiet or quieter mode of operation. At a block 215, the method 200 determines if the incoming call has ended. At a block 220, if the method 200 has determined that the incoming call has ended, then the vehicle component(s) revert to their respective operational mode prior to the quiet mode.

Figure 5:
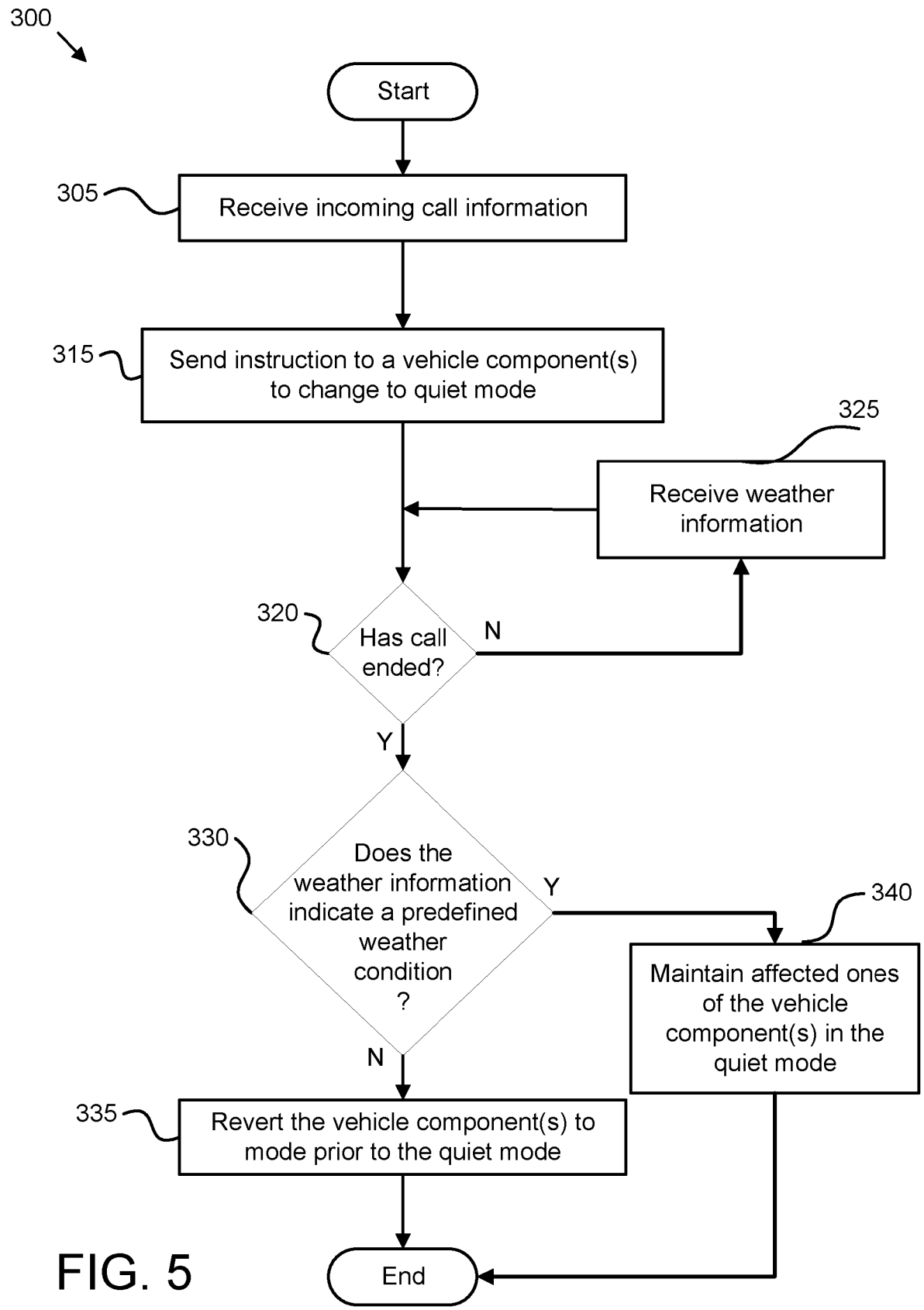
FIG. 5 is a flow diagram of a method performed by a controller in accordance with an embodiment.

Referring to FIG. 5, a flow diagram of a method 300 is described. At a block 305, incoming call information is received from a communication device. At a block 315, an instruction(s) is sent to a vehicle component(s) to change to a quiet or quieter mode of operation. At a block 320, the method 300 determines if the incoming call has ended. If the method 300 determines that the incoming call has not ended, weather information is received at a block 325. If the method 300 determines that the incoming call has ended, then at a decision block 330, the method 300 determines if the weather information indicates a predefined weather condition. If the method 300 determines the weather information does not indicate the predefined weather condition, then, at a block 335, the vehicle component(s) reverts to the operational mode prior to the quiet mode. If the method 300 determines the weather information indicates the predefined weather condition, then, at a block 340, affected ones of the vehicle component(s) are maintained in the quiet mode or a modified mode/position that is different than the operational mode prior to the quiet mode.

Embodiments

A. A method at a vehicle, a method comprising: receiving an incoming communication; and sending a first instruction to one or more vehicle components, the first instruction configured to cause the one or more vehicle components to be placed in a reduced sound producing operational mode.

B. The method of A, further comprising: identifying completion of the incoming communication; and sending a second instruction to the one or more vehicle components, the second instruction configured to cause the one or more vehicle components to return to a mode of operation the one or more vehicle components were in before being placed in the reduced sound producing operational mode or to change to a predefined operational mode.

C. The method of B, further comprising: recording a setting of the one or more vehicle components prior to the one or more vehicle components being placed in the reduced sound producing operational mode, wherein the second instruction includes instructions to return the one or more vehicles components to the recorded setting.

D. The method of any of A-C, wherein sending the first instruction comprises sending the first instruction to a window controller, a sunroof controller, a ventilation controller, an engine controller, a suspension controller, an entertainment system controller, or a combination thereof.

E. The method of D, wherein the ventilation controller includes a vent controller, a fan motor controller, or both.

F. The method of any of A-E, further comprising: receiving weather information; identifying completion of the incoming communication; and maintaining at least a portion of the one or more vehicle components in the reduced sound producing operational mode based on identifying completion of the incoming communication and the weather information indicating a predefined weather condition.

G. The method of F, wherein the portion of the one or more vehicle components include a sunroof, windows, or both.

H. An apparatus comprising: a communication device; a processor in data communication with the communication device; and a storage device configured to store machine-readable instructions that, when executed by the processor, cause the processor to: receive an indication of an incoming communication from the communication device; and send a first instruction to one or more vehicle components, the first instruction configured to place the one or more vehicle components in a reduced sound producing operational mode.

I. The apparatus of H, wherein the storage device is further configured to store machine-readable instructions that, when executed by the processor, cause the processor to: receive an indication of completion of an audio communication; and send a second instruction to the one or more vehicle components, the second instruction configured to cause the one or more vehicle components to return to a mode of operation the one or more vehicle components were in before being placed in the reduced sound producing operational mode or to change to a predefined operational mode.

J. The apparatus of I, wherein the storage device is further configured to store machine-readable instructions that, when executed by the processor, cause the processor to: record a setting of the one or more vehicle components prior to the one or more vehicle components being placed in the reduced sound producing operational mode, wherein the second instruction includes instructions to return the one or more vehicles components to the recorded setting.

K. The apparatus of any of H-J, wherein the storage device is further configured to store machine-readable instructions that, when executed by the processor, cause the processor to send the first instruction to a window controller, a sunroof controller, a ventilation controller, an engine controller, a suspension controller, and entertainment system controller, or a combination thereof.

L. The apparatus of K, wherein the ventilation controller includes a vent controller, a fan motor controller, or both.

M. The apparatus of any of H-L, wherein the storage device is further configured to store machine-readable instructions that, when executed by the processor, cause the processor to: receive weather sensor information; identifying completion of the incoming communication; and maintain at least a portion of the one or more vehicle components in the reduced sound producing operational mode based on identifying completion of the incoming communication and the weather sensor information indicating a predefined weather condition.

N. The apparatus of M, wherein the portion of the one or more vehicle components include a sunroof, windows, or both.

O. A system comprising: one or more vehicle components; a communication device; a processor in data communication with the communication device; and a storage device configured to store machine-readable instructions that, when executed by the processor, cause the processor to: receive an indication of an incoming communication from the communication device; and send a first instruction to the one or more vehicle components, wherein the one or more vehicle components are placed in a reduced sound producing operational mode based on the first instruction.

P. The system of O, wherein the storage device is further configured to store machine-readable instructions that, when executed by the processor, cause the processor to: receive an indication of completion of the incoming communication; and send a second instruction to the one or more vehicle components, wherein the second instruction is configured to return the one or more vehicle components to a mode of operation before being placed in the reduced sound producing operational mode or to change the one or more vehicle components to a predefined operational mode.

Q. The system of P, wherein the storage device is further configured to store machine-readable instructions that, when executed by the processor, cause the processor to record a setting of the one or more vehicle components prior to the one or more vehicle components being placed in the reduced sound producing operational mode, wherein the second instruction includes instructions to return the one or more vehicles components to the recorded setting.

R. The system of any of O-Q, wherein the one or more vehicle components comprises a window controller, a sunroof controller, a ventilation controller, an engine controller, a suspension controller, and entertainment system controller, or a combination thereof.

S. The system of R, wherein the ventilation controller includes a vent controller, a fan motor controller, or both.

T. The system of any of O-S, further comprising a weather sensor configured to generate weather information, wherein the storage device is further configured to store machine-readable instructions that, when executed by the processor, cause the processor to: identify completion of the incoming communication; identifying completion of the incoming communication; and maintain at least a portion of the one or more vehicle components in the reduced sound producing operational mode based on identifying completion of the incoming communication and the weather information indicating a predefined weather condition.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by an apparatus at a vehicle, the method comprising:
   receiving an incoming communication from a communication device; and
   based on the receipt of the incoming communication, sending a first instruction to an engine controller, a suspension controller, and a ventilation controller, to operate one or more vehicle components associated with the engine controller, the suspension controller, and the ventilation controller a reduced sound producing operational mode.

2. The method of claim 1, further comprising:
   identifying completion of the incoming communication; and
   based on the completion of the incoming communication, sending a second instruction to the engine controller, the suspension controller, and the ventilation controller, the second instruction configured to cause the one or more vehicle components associated with the engine controller, the suspension controller, and the ventilation controller to return to a mode of operation the one or more vehicle components were in before being placed in the reduced sound producing operational mode or to change to a predefined operational mode.

3. The method of claim 2, further comprising recording a setting of the one or more vehicle components associated with the engine controller, the suspension controller, and the ventilation controller prior to the one or more vehicle components being placed in the reduced sound producing operational mode, wherein the second instruction includes instructions to return the one or more vehicles components to the recorded setting.

4. The method of claim 1, wherein sending the first instruction further comprises sending the first instruction to a window controller, a sunroof controller, a and an entertainment system controller, the first instruction configured to cause another one or more vehicle components associated with the window controller, the sunroof controller, and the entertainment system controller to be placed in the reduced sound producing operational mode or a combination thereof.

5. The method of claim 1, wherein the ventilation controller includes a vent controller, a fan motor controller, or both.

6. The method of claim 4, further comprising:
   receiving weather information;
   identifying completion of the incoming communication; and
   maintaining at least a portion of the another one or more vehicle components associated with the window controller, the sunroof controller, and the entertainment system controller in the reduced sound producing operational mode based on identifying completion of the incoming communication and the weather information indicating a predefined weather condition.

7. The method of claim 6, wherein the portion of the another one or more vehicle components include a sunroof, windows, or both.

8. An apparatus at a vehicle comprising:
a communication device;
a processor in data communication with the communication device; and
a storage device configured to store machine-readable instructions that, when executed by the processor, cause the processor to:
receive an indication of an incoming communication from the communication device; and
based on the receipt of the indication of the incoming communication, send a first instruction to an engine controller, a suspension controller, and a ventilation controller, to operate one or more vehicle components associated with the engine controller, the suspension controller, the ventilation controller in a reduced sound producing operational mode.

9. The apparatus of claim 8, wherein the storage device is further configured to store machine-readable instructions that, when executed by the processor, cause the processor to:
receive an indication of completion of the incoming communication; and
based on the receipt of the indication of the completion of the incoming communication, send a second instruction to the engine controller, the suspension controller, and the ventilation controller, the second instruction configured to cause the one or more vehicle components associated with the engine controller, the suspension controller, and the ventilation controller to return to a mode of operation the one or more vehicle components were in before being placed in the reduced sound producing operational mode or to change to a predefined operational mode.

10. The apparatus of claim 9, wherein the storage device is further configured to store machine-readable instructions that, when executed by the processor, cause the processor to record a setting of the one or more vehicle components prior to the one or more vehicle components associated with the engine controller, the suspension controller, and the ventilation controller being placed in the reduced sound producing operational mode, wherein the second instruction includes instructions to return the one or more vehicles components to the recorded setting.

11. The apparatus of claim 8, wherein the storage device is further configured to store machine-readable instructions that, when executed by the processor, cause the processor to send the first instruction to a window controller, a sunroof controller, and entertainment system controller, the first instruction configured to cause another one or more vehicle components associated with the window controller, the sunroof controller, and the entertainment system controller to be placed in the reduced sound producing operational mode.

12. The apparatus of claim 8, wherein the ventilation controller includes a vent controller, a fan motor controller, or both.

13. The apparatus of claim 11, wherein the storage device is further configured to store machine-readable instructions that, when executed by the processor, cause the processor to:
receive weather sensor information;
identify completion of the incoming communication; and
maintain at least a portion of the another one or more vehicle components associated with the window controller, the sunroof controller, and the entertainment system controller in the reduced sound producing operational mode based on identifying completion of the incoming communication and the weather sensor information indicating a predefined weather condition.

14. The apparatus of claim 13, wherein the portion of the another one or more vehicle components include a sunroof, windows, or both.

15. A system at a vehicle comprising:
one or more vehicle components;
a communication device;
a processor in data communication with the communication device; and
a storage device configured to store machine-readable instructions that, when executed by the processor, cause the processor to:
receive an indication of an incoming communication from the communication device; and
based on the receipt of the indication of the incoming communication, send a first instruction to an engine controller, a suspension controller, and a ventilation controller, to operate one or more vehicle components associated with the engine controller, the suspension controller, and the ventilation controller in a reduced sound producing operational mode based on the first instruction.

16. The system of claim 15, wherein the storage device is further configured to store machine-readable instructions that, when executed by the processor, cause the processor to:
receive an indication of completion of the incoming communication; and
based on the receipt of the indication of completion of the incoming communication, send a second instruction to the engine controller, the suspension controller, and the ventilation controller,
wherein the one or more vehicle components associated with the engine controller, the suspension controller, and the ventilation controller are configured to operate in a mode of operation before being placed in the reduced sound producing operational mode or a predefined operational mode based on the second instruction.

17. The system of claim 16, wherein the storage device is further configured to store machine-readable instructions that, when executed by the processor, cause the processor to record a setting of the one or more vehicle components associated with the engine controller, the suspension controller, and the ventilation controller prior to the one or more vehicle components being placed in the reduced sound producing operational mode, wherein the second instruction includes instructions to return the one or more vehicles components to the recorded setting.

18. The system of claim 15, wherein sending the first instruction further comprises sending the first instruction to a window controller, a sunroof controller, and entertainment system controller,, the first instruction configured to cause another one or more vehicle components associated with the window controller, the sunroof controller, and the entertainment system controller to be placed in the reduced sound producing operational mode.

19. The system of claim 15, wherein the ventilation controller includes a vent controller, a fan motor controller, or both.

20. The system of claim 18, further comprising a weather sensor configured to generate weather information, wherein the storage device is further configured to store machine-readable instructions that, when executed by the processor, cause the processor to:
identify completion of the incoming communication; and maintain at least a portion of the another one or more vehicle components associated with the window controller, the sunroof controller, and the entertainment system controller in the reduced sound producing operational mode based on identifying completion of the incoming communication and the weather information indicating a predefined weather condition.

* * * * *